Figure 1:
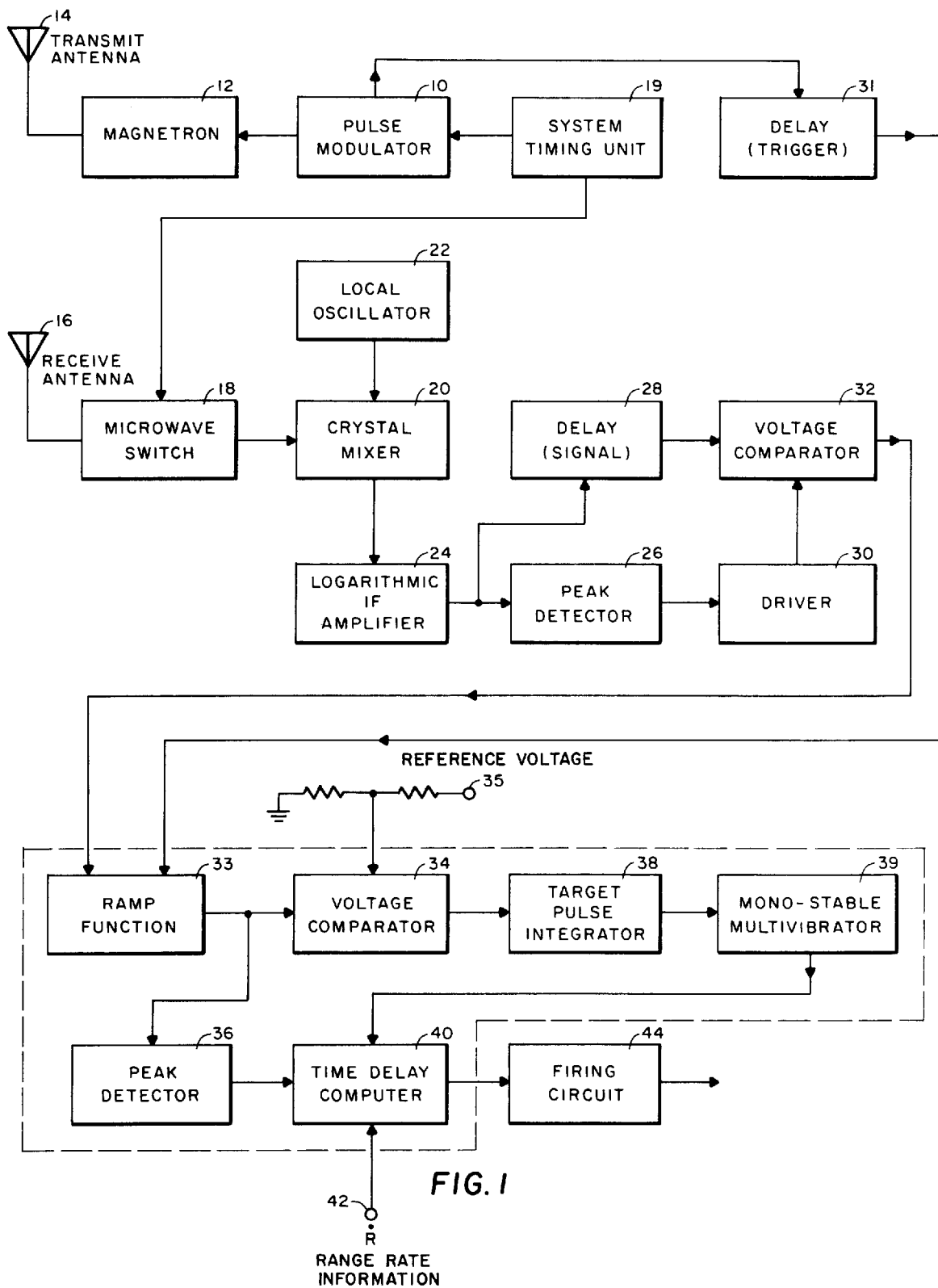

United States Patent [19]

Macomber

[11] Patent Number: 6,166,680
[45] Date of Patent: Dec. 26, 2000

[54] RANGE DEPENDENT TIME DELAY TARGET DETECTING DEVICE

[75] Inventor: Bennie D. Macomber, Norco, Calif.

[73] Assignee: The United States of America as represented by the Secretary of the Navy, Washington, D.C.

[21] Appl. No.: 05/069,518

[22] Filed: Aug. 6, 1970

[51] Int. Cl.[7] .............................. G01S 13/00; F41G 7/20
[52] U.S. Cl. ............................................................ 342/62
[58] Field of Search .......................... 343/7 PF, 12 MD; 102/70.2 P; 342/62, 63, 65, 68; 344/3.19

[56] References Cited

U.S. PATENT DOCUMENTS 3,492,632  1/1970  Vilkomerson et al. .
3,594,791  7/1971  Pintell .

Primary Examiner—Daniel T. Pihulic
Attorney, Agent, or Firm—Harvey Fendelman; Michael A. Kagan; Thomas M. Phillips

[57] ABSTRACT

A target detecting device which measures the range to the target and generates a variable d.c. voltage that is a function of the range. The range voltage is then applied to a time delay computer, along with range rate voltage, to permit a time delay computation which is a function of both the distance to the target and the missile-target closing velocity.

3 Claims, 3 Drawing Sheets

RANGE DEPENDENT TIME DELAY TARGET DETECTING DEVICE

This application relates to copending applications Ser. No. 69,516, filed Aug. 6, 1970 for "Pulse Automatic Range Anti-Ship Missile Fuze", and Ser. No. 69,517, filed Aug. 6, 1970 for "Automatic Range Reducing Target Detecting Device", both assigned to the same assignee.

STATEMENT OF GOVERNMENT INTEREST

The invention herein described may be manufactured and used by or for the Government of the United States of America for governmental purposes without the payment of any royalties thereon or therefor.

BACKGROUND OF THE INVENTION

1. Field of the Invention

The present invention relates to target detecting devices and more particularly to target detecting devices having a controlled warhead burst initiation.

2. Description of the Prior Art

In proximity fuze systems presently in use on anti-aircraft guided missiles, a variable time delay between target detection and warhead burst is used to optimize the probability of the fragments from the warhead striking the target in a vulnerable area. The present invention is an improvement over the target detecting device-shown and described in my copending application Ser. No. 583,497 filed Sep. 29, 1966 for Range Sensing Target Detecting Device. In my copending application, the system described used a detection range which consists of several subranges. Each subrange and its associated time delay computer provide a time delay optimized for a particular range bracket. Reducing the length of the subranges will provide a greater range measuring accuracy but also requires more channels to cover the total range. The system then becomes increasingly complex, is more expensive and occupies a greater volume.

SUMMARY

The present invention provides a means of signal processing for a short pulse radar target detecting device in which range is continuously measured. A ramp function generator is started when a return signal is received and is stopped at a fixed time after transmission of the pulse. Since the ramp function is always stopped at the same time interval after the transmission of a pulse, the amplitude of the ramp voltage will depend upon how soon the return pulse is received. The signal must be received before the time interval has expired if a ramp voltage is to be generated. The amplitude of the ramp voltage at time of cutoff has a fixed relation to the range of the reflected pulse that started the ramp generator. A peak detector is provided to detect the ramp voltage and this detected voltage is fed to the time delay computer along with the range rate voltage. At the time of target recognition, the ramp voltage is detected and held to provide range input to the time delay computer. A delay is then computed for the optimum detonation of the warhead. Accordingly, an object of the invention is the provision of an improved target detecting device that overcomes the disadvantages of prior known devices.

Another object is the provision of an improved target detecting device which will detect range at time of target recognition to compute the optimum warhead burst control delay.

Figure 2A:
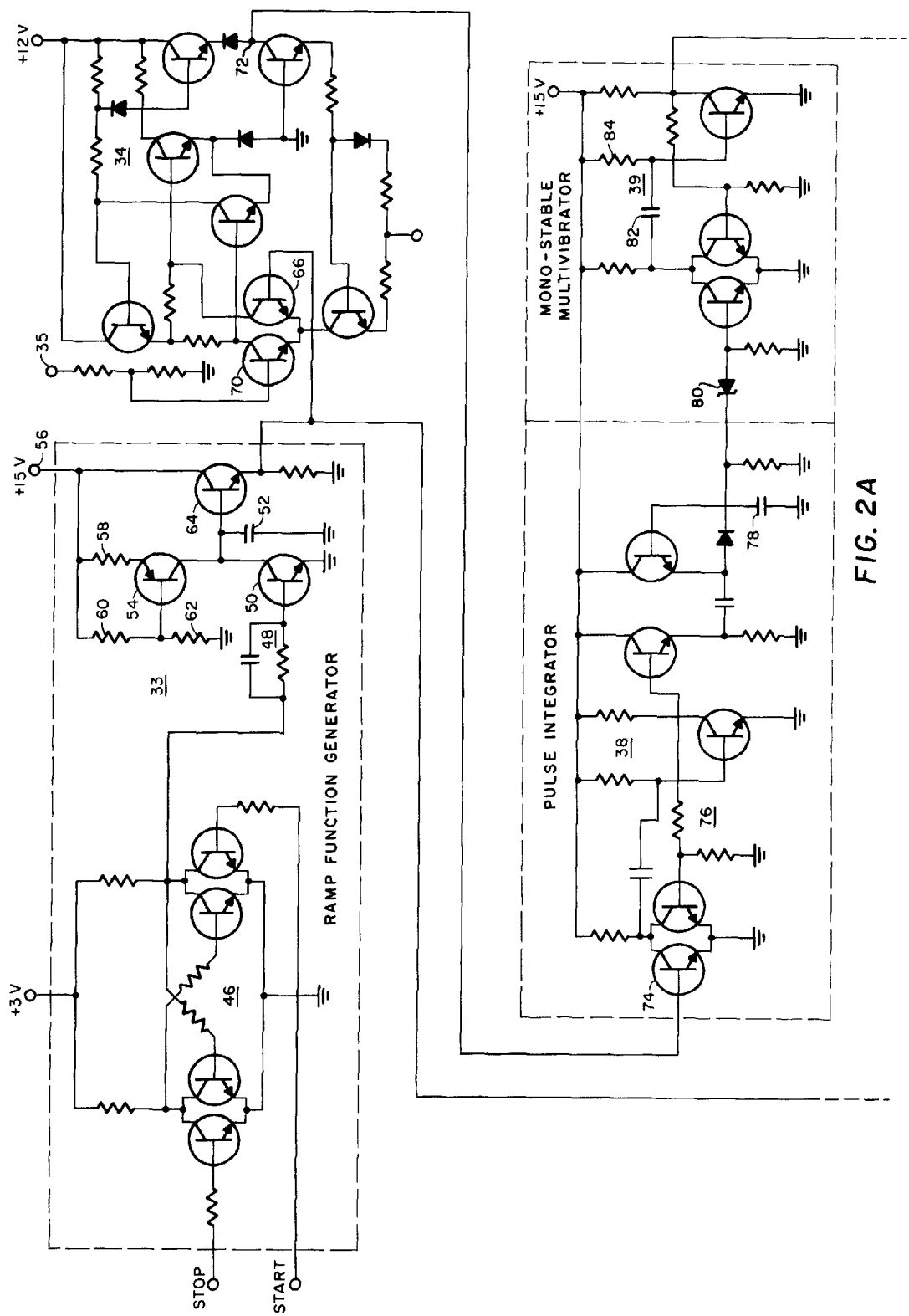
Figure 2B:
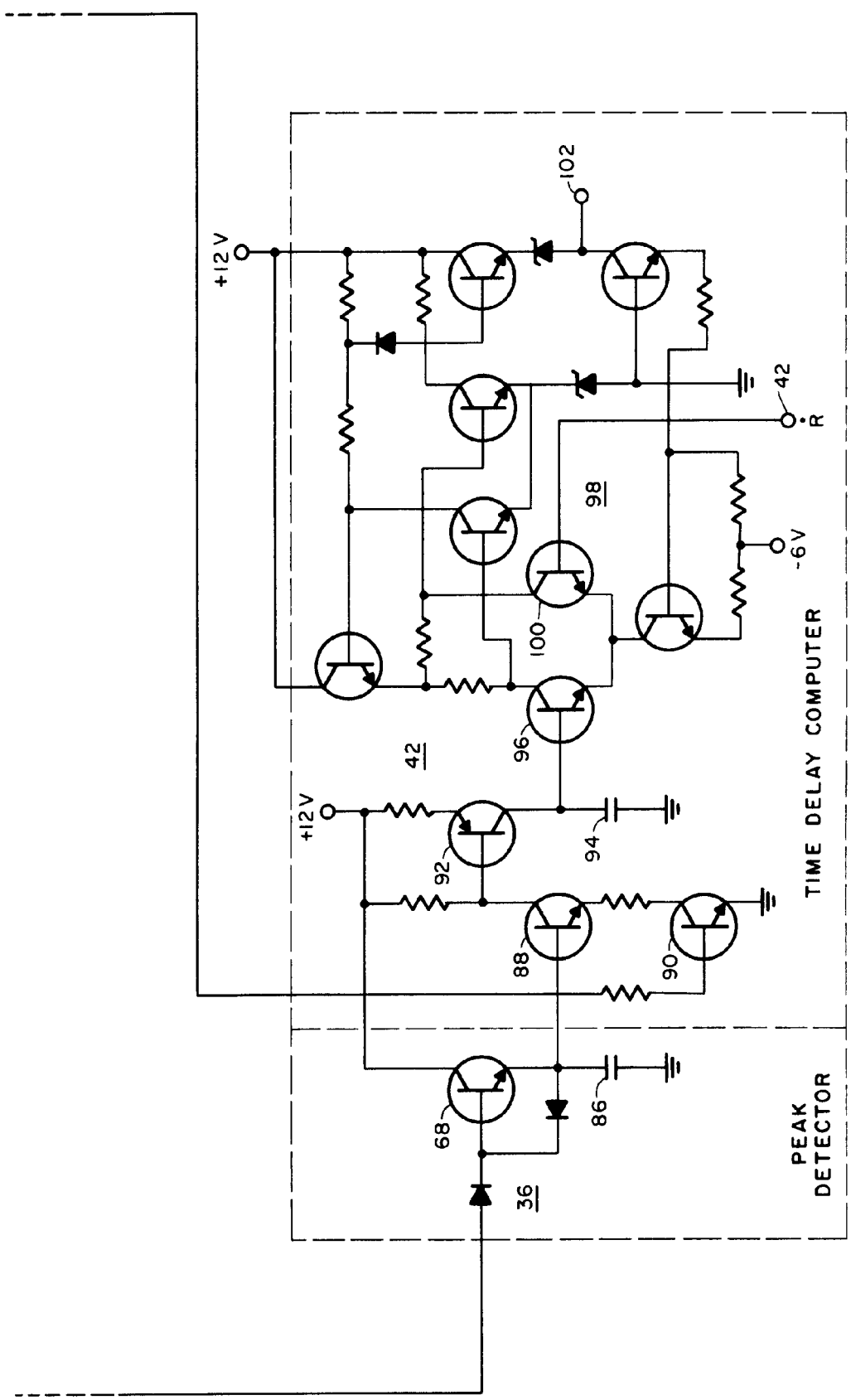

Other objects and many of the attendant advantages of this invention will become readily appreciated as the same becomes better understood by reference to the following detailed description when considered in connection with the accompanying drawings wherein:

FIG. 1 is a block diagram of a portion of a target detecting device embodying the present invention, and FIGS. 2A and 2B are a schematic diagram of the novel signal processing portion of FIG. 1.

Referring to FIG. 1 there is shown a short pulse radar with a logarithmic IF amplifier in the receiver section. The short pulse radar functions in the usual manner having a pulse modulator 10 modulating a transmitting magnetron 12 which provides pulsed energy to transmitting antenna 14. Reflected signals from a target or the sea surface are received in antenna 16 and are fed by microwave switch 18 to crystal mixer 20, where it is mixed with the output from local oscillator 22. Microwave switch 18 is gated on by means of system timing unit 19. The difference frequency output from crystal mixer 20 is fed to logarithmic IF amplifier 24. The output of logarithmic IF amplifier 24 is fed to peak detector 26 and to signal delay circuit 28. The output of peak detector 26 is fed through driver 30 to voltage comparator 32 which has a second input from signal delay circuit 28.

The output of voltage comparator 32 is fed as the start input to ramp function generator 33. A stop pulse for ramp function generator 33 is fed from pulse modulator 10 through delay trigger circuit 31. The output of ramp function generator 33 is fed to voltage comparator 34 and peak detector 36. Voltage comparator 34 has a reference input voltage applied at terminal 35. The output of target pulse integrator 38 turns on monostable multivibrator 39 which generates an output pulse of fixed width and constant amplitude. The output pulse from multivibrator 39 is fed to time delay computer 40 and should have a width of sufficient duration to exceed the maximum time delay of time delay computer 40. The output of peak detector 36 and the range-rate voltage from the missile, terminal 42, are also fed as inputs to time delay computer 40. Based on its inputs, computer 40 computes a time delay signal that is fed to firing circuit 44 for initiating the warhead (not shown) at the optimum time.

Referring to the schematic diagram of FIG. 2, ramp function generator 33 is shown as a bistable multivibrator 46 coupled through a coupling network 48 to the base of switching transistor 50. Transistor 50 is connected in parallel with charging capacitor 52 in series with transistor 54 to a positive voltage source at terminal 56. Transistor 54 is biased by means of resistors 58, 60 and 62 to provide a constant current Source. Capacitor 52 is connected in series with transistor 54 and when transistor 50 is nonconducting will be charged at a uniform rate.

The ramp voltage appearing across capacitor 52 is coupled by means of emitter follower 64 as the simultaneous inputs to the base of transistor 66 of voltage comparator 34 and the base of transistor 68 of peak detector 36. A reference voltage or range cut-off voltage is applied to the base of transistor 70 of comparator 34 from terminal 35. When the input signal applied to the base of transistor 66 is greater in amplitude than the reference voltage applied to the base of transistor 70, a positive pulse will appear at the output terminal 72. The positive pulses at output 72 are fed to the base of transistor 74 of monostable multivibrator 76 of pulse integrator 38. The pulses generated by monostable multivibrator 76 are stored on capacitor 78 until a sufficient number of pulses have been counted to exceed the threshold of zener diode 80. Monostable multivibrator 39 is turned on when current flows in zener diode 80 and generates a fixed width constant amplitude pulse. The values of capacitor 82 and resistor 84 should be chosen so that the width of the generated pulse is equal to or greater than the maximum time delay of time delay computer 40.

Capacitor 86 is charged to the value of the ramp voltage applied to the base of emitter follower 68. The voltage on capacitor 86 is coupled to the base of transistor 88. Transistor 90 acts as a switch and the pulse generated by monostable multivibrator 39 must be present on its base before transistor 88 will conduct. Assuming transistor 90 is conducting, and a sufficient voltage is present on the base of transistor 88 to cause it to conduct, transistor 92 is turned on and charges capacitor 94 at a rate proportional to the voltage on capacitor 86. The voltage on capacitor 94 is applied to the base of transistor 96 of voltage comparator 98. The range-rate voltage (from the missile) at terminal 42 is applied to the base of transistor 100. When the voltage on the base of transistor 96 exceeds the voltage on the base of transistor 100 a positive pulse will appear at output terminal 102 to activate firing circuit 44.

What is claimed is:

1. In a range dependent time delay target detecting device for use in a guided missile, the combination comprising:

(a) a short pulse radar for transmitting pulsed signals and receiving said transmitted signals reflected from targets of interest, (b) a ramp function generator having a first input coupled to said radar and being responsive to received signals passed by said radar to start the generating of a ramp function and having a second input coupled through a delay circuit to said radar and being responsive to delayed pulses from the transmitting section of said radar for stopping the generating of said ramp function, (c) a voltage comparator having a first input coupled to the output of said ramp function generator and a second input coupled to a reference voltage and generating an output signal when the output from said ramp function generator exceeds said reference voltage, (d) a peak voltage detector coupled to said ramp function generator for providing an output voltage inversely proportional to the range of the reflected signals, (e) a pulse generating circuit means coupled to said voltage comparator for generating a fixed width constant amplitude pulse in response to a detected target, (f) a time delay computer having a first input coupled to said peak detector, a second input coupled to said pulse generating circuit means and a third input coupled to receive a range-rate voltage from the missile and generating an output signal delayed in time determined by voltage from said peak detector and the range-rate voltage from the missile.

2. The target detecting device of claim 1 wherein the duration of the pulse generated by said pulse generating circuit means is equal to or longer than the longest time delay of said time delay computer.

3. The target detecting device of claim 1 wherein the output voltage from said peak detector is proportional to the maximum amplitude of the ramp voltage.

* * * * *